(12) United States Patent
Jones

(10) Patent No.: US 8,545,744 B2
(45) Date of Patent: Oct. 1, 2013

(54) FIBRE-REINFORCED COMPOSITE MOULDING AND MANUFACTURE THEREOF

(75) Inventor: Daniel Thomas Jones, Cowes (GB)

(73) Assignee: Gurit (UK) Ltd., Isle of Wight (GB)

( * ) Notice: Subject to any disclaimer, the term of this patent is extended or adjusted under 35 U.S.C. 154(b) by 914 days.

(21) Appl. No.: 12/532,907

(22) PCT Filed: Mar. 26, 2008

(86) PCT No.: PCT/GB2008/001032
§ 371 (c)(1),
(2), (4) Date: Feb. 1, 2010

(87) PCT Pub. No.: WO2008/119942
PCT Pub. Date: Oct. 9, 2008

(65) Prior Publication Data
US 2010/0143145 A1    Jun. 10, 2010

(30) Foreign Application Priority Data

Mar. 29, 2007  (GB) .................................... 0706198.9
Oct. 19, 2007  (GB) .................................... 0720585.9

(51) Int. Cl.
*B32B 37/00* (2006.01)
(52) U.S. Cl.
USPC ......................................... 264/263; 264/258
(58) Field of Classification Search
USPC ............................................... 264/263, 258
See application file for complete search history.

(56) References Cited

U.S. PATENT DOCUMENTS

| 3,730,808 A |   | 5/1973 | Fekete |
|---|---|---|---|
| 4,311,661 A | * | 1/1982 | Palmer .......................... 264/510 |

(Continued)

FOREIGN PATENT DOCUMENTS

| DE | 19915083 C1 | 4/2000 |
|---|---|---|
| DE | 10156123 A1 | 5/2003 |

(Continued)

OTHER PUBLICATIONS

Vasile et al., "Handbook of Polymer Blends and Composites", 2002, Rapra Technology Limited, p. 315, 321-322, 403-405.*

(Continued)

*Primary Examiner* — Galen Hauth
(74) *Attorney, Agent, or Firm* — Novak Druce Connolly Bove + Quigg LLP

(57) ABSTRACT

Method of manufacturing a fiber-reinforced composite molding, the method comprising the steps of: (a) disposing at least one layer of fibrous reinforcing material within a mold; (b) disposing at least one pre-preg layer adjacent to the fibrous reinforcing material, the pre-preg layer comprising fibrous reinforcement at least partially impregnated with uncured first resin material, to form a laminar assembly of the at least one layer of fibrous reinforcing material and the at least one pre-preg layer within the mold; (c) applying a vacuum to the assembly; (d) infusing a flowable uncured second resin material, under the vacuum, into the at least one layer of fibrous reinforcing material; and (e) curing the first and second resin materials at least partially simultaneously to form the fiber-reinforced composite molding which comprises at least one first structural portion formed from the fibrous reinforcement and the cured first resin material bonded to at least one second structural portion formed from the at least one layer of fibrous reinforcing material and the cured second resin material.

24 Claims, 4 Drawing Sheets

(56) References Cited

U.S. PATENT DOCUMENTS

| | | | |
|---|---|---|---|
| 5,104,718 A | 4/1992 | Asada et al. | |
| 5,213,713 A | 5/1993 | Reitz | |
| 5,766,541 A | 6/1998 | Knutsson | |
| 6,048,488 A * | 4/2000 | Fink et al. | 264/510 |
| 6,527,894 B1 | 3/2003 | Rocker et al. | |
| 6,548,431 B1 * | 4/2003 | Bansal et al. | 442/327 |
| 2003/0219578 A1 * | 11/2003 | Jones et al. | 428/292.1 |
| 2004/0265406 A1 | 12/2004 | Lorenz et al. | |

FOREIGN PATENT DOCUMENTS

| | | |
|---|---|---|
| EP | 1400341 A | 3/2004 |
| EP | 1504888 A | 2/2005 |
| EP | 1625929 A1 | 2/2006 |
| EP | 1731282 A1 | 12/2006 |
| GB | 2198386 A | 6/1998 |
| GB | 2369597 A | 6/2002 |
| GB | 2401081 A | 3/2004 |
| GB | 2433466 A | 6/2007 |
| JP | 2162017 | 6/1990 |
| JP | 03006093 A | 1/1991 |
| JP | 2001064406 A | 3/2001 |
| WO | WO 98/38031 A1 | 9/1998 |
| WO | WO 00/27632 A1 | 5/2000 |
| WO | WO 00/27632 A2 | 5/2000 |
| WO | WO 00/56524 A1 | 9/2000 |
| WO | WO 02/28624 A1 | 4/2002 |
| WO | WO 02/090087 A2 | 11/2002 |
| WO | WO 02/090089 A1 | 11/2002 |
| WO | WO 02/094564 A1 | 11/2002 |

OTHER PUBLICATIONS

Jun. 19, 2008 International Search Report and Written Opinion in related PCT/GB2008/001030.

Jul. 16, 2008 International Search Report and Written Opinion in related PCT/GB2008/001031.

Jun. 17, 2008 International Search Report and Written Opinion in related PCT/GB2008/001032.

Jul. 26, 2007 GB Search Report in related GB 0706198.9.

Aug. 29, 2008 GB Search and Examination Report in related GB 0720581.8.

Aug. 29 GB Search and Examination Report in related GB 0720585.9.

Apr. 15, 2008 GB Search and Examination Report in related GB 0720583.4.

Mar. 13, 2012 First Office Action on Chinese Patent Application for Invention No. 200880013963.8 in the name of Gurit (UK) Ltd., and English Translation.

* cited by examiner

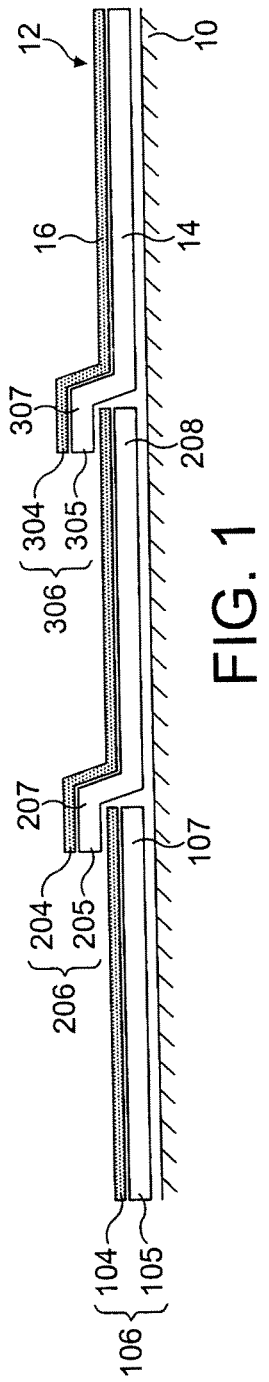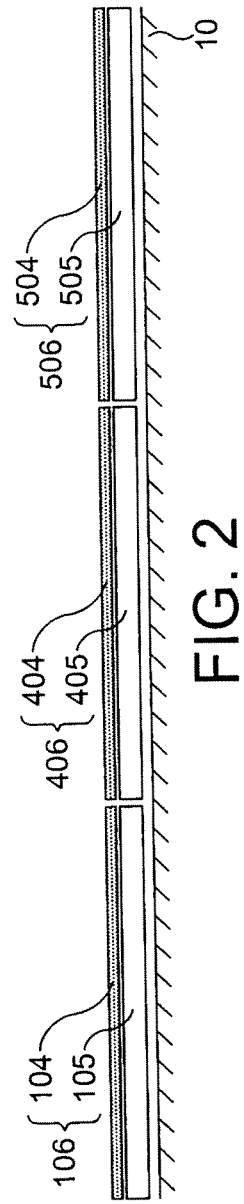

FIBRE-REINFORCED COMPOSITE MOULDING AND MANUFACTURE THEREOF

FIELD OF THE INVENTION

The present invention relates to a method of manufacturing a fibre-reinforced composite moulding and to a fibre-reinforced composite moulding. In particular, the present invention relates to a fibre-reinforced composite moulding suitable for manufacturing large composite structures, such as turbine blades, bridges and boat hulls.

BACKGROUND

The three main thermoset composite processing methods currently used for manufacturing wind turbine blades are:
1. wet-laminating (also known as open moulding)—in this method, the thermoset resin can cure in ambient conditions, but the tools are usually heated to elevated temperature, 50-90° C., to speed up the resin curing process;
2. the use of pre-preg materials, and the Applicant's own and pre-impregnated dry touch composite material sold under the product name SPRINT®—such materials are typically cured at an elevated temperature between 85° C. to 120° C.; and
3. vacuum assisted resin transfer moulding (also known as VARTM, resin infusion, or vacuum infusion)—in this method liquid resin is infused under a vacuum into a dry fibre composite, and then can cure in ambient conditions, although the tools (i.e. the moulds) are usually heated to an elevated temperature between 50-90° C. to speed up the curing process.

The two main design concepts for a wind turbine are the structural spar concept and the structural shell concept. In the structural spar concept a separate load carrying beam is made and bonded into two aerofoil sections. In the structural shell concept the two outer aerofoil shells are manufactured containing the main structural fibre materials. A separate shear web is then used to provide the shear connection to form the structural beam.

When using a wet-laminating or resin infusion (VARTM) processes it is most common to use the structural shell design concept. The majority of the composite laminate is unidirectional (UD) to give the turbine its flap-wise flexural rigidity. The remaining fibre materials are usually stitched multiaxial products to provide shear reinforcement. Foam or wooden cores are also used to locally stiffen the blade sections. In the main structural beam portion the fibre reinforced laminate can be in excess of 30 mm thick, and can reach a thickness of 80 mm in some of the larger blades on the market, to give the necessary stiffness and strength. In the main beam portion the UD material is interleaved at points with biaxial material to give the necessary shear strength, because in these thick sections transverse cracks would occur if it was not periodically reinforced in this manner.

When using ambient temperature curing resin systems, a significant temperature rise can occur in these thick sections due to the exothermic heat generation of the curing process. To allow for this exotherm and be able to input heat to speed up the cure rate, a tool tolerant to temperatures of typically 90-130 deg C. would typically be required. This increases tool cost and complexity.

To make the unidirectional fibres handleable to apply into the mould, the UD fibres are supplied as a pre-made fabric which acts to hold the fibres together. This process adds cost and introduces waviness into the fibre which lowers its strength, particularly in compression. In thick composite sections, carbon fibre unidirectional fabrics have also proved to be difficult to reliably impregnate with a VARTM process. This is mainly due to the smaller diameter of carbon fibres leading to greater compaction and lower permeability under vacuum.

The handling of high volumes of dry carbon fibre can lead to significant volumes of small, loose, carbon fibre threads becoming airborne, through the wear and tear of handling the material, which is both hazardous to health and electrical equipment (as short circuits can inadvertently be established).

These factors make the use of uni-directional pre-pregs highly attractive as the material can be correctly impregnated in the pre-preg machine and made directly from low cost fibre rovings. The resin in the pre-preg holds the fibres together and in straight columns, maintaining greater compressive modulus and strength. With a pre-preg machine it is easier to isolate the dry fibre materials compactly inside a dedicated extraction space to prevent any loose fibre contaminating the wider factory area. Once impregnated the airborne loose fibres and the associated safety and electrical hazards are eliminated.

When looking at the cost per kg to buy a pre-preg vs the dry fibre and associated resin infusion resin, the pre-preg cost on paper is higher. It is complicated to generate the side-by-side cost as there is often a cost of quality with infusion processes which generally are less reliable than pre-preg processes. There is also significant resin waste generated in the injection pipe-work and other infusion consumables which depends on the part being manufactured.

When comparing the cost of unidirectional vs multiaxial pre-pregs, the unidirectional pre-preg has a lower cost per kg as there is no cost associated with first converting the fibre rovings into a fabric. So when comparing the cost per kg of unidirectional pre-preg against an infused uni-directional fabric the uni-directional pre-preg is cost competitive before making a detailed analysis of the additional cost of the infusion processes. A larger cost per kg difference exists when comparing a multiaxial pre-preg vs an infused multiaxial fabric making it the cost benefit analysis less clear.

The unidirectional pre-pregs have improved mechanical properties allowing a fewer layers and a lighter weight beam to be used. For this reason pre-cured uni-directional pre-prep stacks are already used in resin infused wind turbines. In current commercial manufacturing processes, they are first laminated into a stack, then cured, then prepared for bonding, and then inserted at various stages into the mould during the lamination process. These steps add cost to the final blade. To make these pre-cured slabs handleable there is usually a maximum length that can be processed and lifted into the mould. They are usually cured and put in as multiple sections with longitudinally spaced scarf (i.e. tapering) joints along the blade length, which provides an area of weakness in the blade.

There is a need in the art for a fibre-reinforced composite moulding, and method of manufacture thereof, that at least partially overcome these problems of the manufacture of such mouldings, in particular large dimension mouldings such as wind turbine blades, which typically have a length of 30 m or more.

SUMMARY OF THE INVENTION

According to a first aspect of the present invention there is provided a method of manufacturing a fibre-reinforced composite moulding, the method comprising the steps of:
(a) disposing at least one layer of fibrous reinforcing material within a mould;
(b) disposing at least one pre-preg layer adjacent to the fibrous reinforcing material, the pre-preg layer comprising fibrous reinforcement at least partially impregnated with uncured first resin material, to form a laminar assembly of the at least one layer of fibrous reinforcing material and the at least one pre-preg layer within the mould;

(c) applying a vacuum to the assembly;

(d) infusing a flowable uncured second resin material, under the vacuum, into the at least one layer of fibrous reinforcing material; and (e) curing the first and second resin materials at least partially simultaneously to form the fibre-reinforced composite moulding which comprises at least one first structural portion formed from the fibrous reinforcement and the cured first resin material bonded to at least one second structural portion formed from the at least one layer of fibrous reinforcing material and the cured second resin material.

Preferably, the first and second resin materials have a respective curing temperature range, the curing temperature ranges overlap, and the curing step (e) is carried out at a temperature within each curing temperature range.

The second infused resin material preferably has a curing temperature range that is lower than the curing temperature range of the first pre-preg resin material. In one preferred embodiment, the curing step is carried out at a temperature within the curing temperature range of the second infused resin material, and the curing of the second resin material is exothermic and generates heat to raise the temperature of the first resin material to within the curing temperature range of the first resin material. In another preferred embodiment, the curing step is carried out at a temperature within the curing temperature range of the second resin material, and the mould is heated to raise the temperature of the first pre-preg resin material to within the curing temperature range of the first pre-preg resin material.

Preferably, the at least one layer of fibrous reinforcing material comprises dry fibrous reinforcing material.

Preferably, the at least one laminar fibrous body of the at least one pre-preg layer comprises unidirectional fibres.

Preferably, in the pre-preg layer the fibrous reinforcement is fully impregnated with uncured first resin material.

The pre-preg layer may comprise a pre-consolidated slab of a plurality of layers of fibrous reinforcement fully impregnated with uncured first resin material.

Alternatively, the at least one pre-preg layer may be partially impregnated and may comprise a sandwich structure of a pair of fibrous reinforcement layers on opposed sides of a layer of the uncured first resin material.

The laminar assembly may comprise a plurality of the layers of fibrous reinforcing material interleaved with a plurality of the pre-preg layers.

Preferably, the mould has a length and a width and the layers of fibrous reinforcing material and pre-preg extend substantially continuously along the length of the mould.

The method may further comprise the step, before step (a), of disposing a surfacing layer on the mould surface, the surfacing layer comprising a third uncured resin material and being in the form of at least one solid sheet, and in steps (a) and (b) the laminar assembly of the at least one layer of fibrous reinforcing material and the at least one pre-preg layer is disposed over the surfacing layer within the mould, and in the curing step (e) the third resin material is cured at least partially simultaneously with the first and second resin materials.

Preferably, the surfacing layer comprises a plurality of surfacing layer segments assembled together to form a continuous surfacing layer.

Preferably, each surfacing layer segment has at least one edge thereof that partially overlaps an adjacent surfacing layer segment.

The third resin material of the surfacing layer may have a thickness of from 100 to 300 microns.

The third resin material of the surfacing layer may have an applied weight thickness of from 100 to 400 grams pre square meter (gsm).

The third resin material of the surfacing layer is supported on a carrier of a sheet material. The sheet material of the surfacing layer may have a weight of from 10 to 90 gsm, Preferably, the sheet material of the surfacing layer comprises a polyester spun bonded scrim material.

Preferably, the sheet material of the surfacing layer is located at or proximal to a first face of the surfacing layer.

Preferably, a first face of the surfacing layer is remote from the mould surface so that a majority of the third resin material is between the sheet material and the mould surface.

Most preferably, the second resin material and the third resin material have different viscosities. The third resin material may have a higher viscosity than that of the second resin material at room temperature (20 degrees Centigrade). The ratio of the viscosity, measured at 20° C. ambient temperature, of the third resin material and of the second resin material may be at least 100/1, more preferably at least 1000/1, yet more preferably at least 10,000/1.

Preferably, in the curing step (e) the second resin material is adapted to initiate curing before the third resin material.

The curing step (e) may be carried out at an elevated temperature above room temperature, preferably at a temperature of from 40 to 90 degrees Centigrade.

Preferably, in the curing step (e) the curing reaction of the second resin material is exothermic which generates heat which accelerates the curing of the third resin material.

The third resin material may be a thermosetting epoxy resin, and/or the first resin material and the second resin material may be thermosetting epoxy resins.

The fibre-reinforced composite moulding may particularly be a wind turbine blade.

According to a second aspect of the present invention there is provided a fibre-reinforced composite moulding comprising a structural laminated portion being formed from at least one first layer, the first layer being farmed from a pre-preg and comprising fibrous reinforcement and cured first resin material, laminated with at least one second layer, the second layer comprising fibrous reinforcement material and a cured second resin material, wherein the first and second resin materials are mutually bonded by having been cured at least partially simultaneously.

Preferably, the fibrous reinforcement comprises unidirectional fibres.

The structural laminated portion may comprise a plurality of the first layers interleaved with a plurality of the second layers.

Preferably, the moulding has a length and a width and the fibrous reinforcement and the fibrous reinforcing material extend substantially continuously along the length of the moulding.

The fibre-reinforced composite moulding preferably further comprises a surface portion laminated to the structural portion, the surface portion being formed of a surfacing layer comprising a plurality of surfacing layer segments moulded together to form a continuous surfacing layer, the surfacing layer comprising a third cured resin material supported on a carrier of a sheet material, The sheet material of the surfacing layer may be located nearer to an interface between the surface portion and the structural portion than to an opposite exposed surface of the surface portion.

The fibre-reinforced composite moulding is most preferably a wind turbine blade.

The present invention is predicated on the finding by the inventor that by using, in particular embodiments, the combination of an ambient temperature curing infusion resin and a higher temperature curing pre-preg resin in a laminate structure, the pre-preg resin can be readily cured, even in relative thick sections of the mould, by receiving additional heat either from the exothermic curing of the infusion resin and/or from heating the tool. The result is that uncured pre-pregs can be combined with a VARTM infusion process in a very efficient improved manufacturing process in which the two resins, infusion and pre-preg, can be cured together in a common curing step. No pre-curing of the pre-preg is required.

This also provides an improved product, for example for long and/or thick mouldings such as wind turbine blades or bridge decks. For long mouldings, the pre-pregs can be incorporated as very long lengths, because they include uncured resin, and so have not had to be sectioned into smaller units for a precuring step, and also are mechanically flexible and so can be accommodated as long lengths with some degree of curvature within the mould. Accordingly, continuous lengths of pre-preg can be applied directly into the mould during the lay-up stage to avoid the scarf joint problem. The final cure step for the pre-preg resin then occurs with the cure of the infused resin of the remainder of the composite laminate.

This contrasts with the known use of smaller cured pre-preg lengths. The longer pre-preg lengths give improved mechanical properties because multiple scarf joints, as discussed above with known pre-preg incorporation, can be avoided. For some products, even very long (30 meters plus, up to about 50 meters) wind turbine blades, the pre-preg can extend as a single length along the entire moulding length without any longitudinally spaced joints.

It is alternatively possible for the method of the invention to provide, for some products, a plurality of individual pre-preg segments interconnected along the length of the mould using the tapering interlocking ends of the known scarf structure and this would still provide manufacturing advantages over the known method of using pre-preps as discussed above. In such a method of the these embodiments of the present invention, the pre-pregs are pre-consolidated in a faster process as compared to the known pre-curing process, rather than cured, to both remove air between the layers and give a handleable stack to place into the mould. Again, the final cure step for the pre-preg resin then occurs with the cure of the infused resin of the remainder of the composite laminate.

In accordance with preferred embodiments of the present invention, an elevated curing temperature uncured thermoset epoxy resin surfacing film, having relatively high viscosity, can be first laminated into a mould, dry fibre is then applied together with the pre-prep layer(s) including uncured pre-preg resin, preferably also thermoset epoxy resin, and then the dry fibre is impregnated with a relatively low viscosity ambient temperature curing resin, preferably also thermoset epoxy resin, by a VARTM infusion process. The mould temperature and/or the ambient air temperature may be raised so the three resin materials can co-cure together.

In one arrangement, the temperature of the mould and/or the surrounding air are increased such that the temperature activation point of the elevated curing thermoset epoxy resin surface film, if present, and the pre-preg resin is reached and the resin materials can co-cure.

In another arrangement, the ambient temperature curing resin which has been infused generates sufficient exothermic heat so that the temperature of the stack increases and the temperature activation point of the elevated curing thermoset epoxy resin surface film, if present, and the pre-preg resin is reached and the resin materials can co-cure.

In further arrangement, a combination of increasing the temperature of the mould and/or the surrounding air is employed, thereby increasing the rate of reaction of the ambient temperature curing infused resin, so that the exothermic heat is produced at a faster rate causing a greater rise in the laminate temperature which can exceed the resin input temperature. This then causes the activation temperature of the elevated curing temperature thermoset epoxy of the pre-preg to be exceeded and the materials can co-cure and a faster rate.

This underlying technical concept of the present invention therefore combines an elevated temperature curing pre-preg with dry fibrous layers which are then infused with low temperature curing resin and the two resins are co-cured. As the pre-preg stack, preferably UD, is interleaved with dry fibre which infuses with the ambient curing resin, this enhances the warm-up of the pre-preg stack due to the exothermic heat generation from the curing infused resin. This in turn helps to increase the pre-preg stack temperature more quickly to achieve the required minimum curing temperature, thereby speeding up the cycle time.

What generally prevents some current elevated curing temperature pre-pregs, for example curing at 70 to 90 degrees Centigrade, from being used commercially on a low temperature tool, adapted to be used at lower temperatures, typically about 20 to 40 degrees Centigrade, is that the low temperature required so as not to damage the tool results in a slow cure rate of the pre-preg at the tool temperature. There is also a concern to avoid any high exothermic heat resulting from curing of the resin of the pre-preg in the thickest section overheating the tool.

However, in the thick sections of the laminate, the high exotherm temperature reached tends to be isolated from the tool surface, since the peak temperature occurs in the laminate centre. Therefore a level of exotherm temperature above the tool Tg can be tolerated.

A fast cycle time can be designed by tuning the activation and cure rate of the pre-preg to match the thinner section (typically 3-5 mm thick) where the surface temperature of the laminate is nearly equal to the peak temperature of the laminate at its centre. In such a case, the limiting process time is the cure rate of the pre-preg at the maximum tool temperature.

In some tools for producing turbine blades for us in wind energy generators, a water heating pipework is provided within the tool for limiting the final mould temperature. In particular the rate of temperature increase of the tool slows dramatically as the tool approaches the temperature of the water input, because there is no longer a significant temperature difference driving the heat transfer to the tool surface from the exothermically heated moulding as the resin cures. The exothermic heat generation of the infusion laminate is highly beneficial in these tools, because a laminate temperature in excess of the water input temperature can be reached to activate and cure the pre-preg resin. The pre-preg resin can then begin its own exothermic reaction and the laminate temperature in excess of the heat input can be maintained for a faster cure within the tool Tg limit.

This expedient would work with pre-pregs having a curing temperature for example of greater than about 90 degrees Centigrade, but the resin curing rate would be rather slow. For methods employing low temperature tools and typically a 60-70 degrees Centigrade pre-preg system, the curing rate would be satisfactory. The higher cost, lower temperature, curing agent employed in the pre-preg resin to make it cure at lower temperature may be employed commercially in combination with the UD pre-preg. This is because the relatively higher cost resin is offset by the UD pre-preg which can use lower cost rovings, because there is no fabric conversion cost. In contrast, fabric pre-pregs have a higher pre-preg cost, and so combining these with a more expensive curing agent is less commercially viable.

Preferred embodiments of the present invention provide interleaving dry fibre and UD pre-preg layers within a mould, fitting core materials to the interleaved layers, and then using a resin infusion process to impregnate the dry materials and bond the core materials to form a unitary composite material.

Preferred embodiments of the present invention also provide that by raising the temperature to co-cure one or more uni-directional pre-pregs incorporating relatively high temperature curing resin and relatively low temperature curing, in particular ambient temperature curing, infusion resin by heating the tool (and also the vacuum bag face if required) so that that the activation temperature of the pre-preg resin is reached and the exothermic heat generation of the infusion resin and the pre-preg resin can assist a more rapid cure of the pre-preg resin.

Preferred embodiments of the present invention have particular application in the production of wind turbine blades, or beams requiring thick UD sections, such as bridge decks.

Preferred embodiments of the present invention can also provide the advantage that low cost, well aligned unidirectional fibres can be applied into a mould to improve the mechanical properties of a beam like structure, for example a wind turbine blade, while still using low cost resin infusion process for the remaining laminate. In addition, the preferred embodiments of the present invention provide can provide the advantage of removing the problems associated with the use of a UD pre-preg with a resin curing activation temperature close to the maximum heat rating or heat input of the tool.

Preferred embodiments of the present invention can further provide the advantage that improved properties of the pre-preg component of the composite laminate can be achieved without requiring a pre-curing step for the pre-preg and also allowing the possible use, where the moulded article requires this, of a continuous pre-preg along the full length of the article, for example a wind turbine blade, which may typically be up to 50 m long.

Preferred embodiments of the present invention can further provide the advantage that can increase the cure rate of the pre-preg resin, lower the overall cure temperature within the mould and therefore enable the use of a lower temperature, and consequently a lower cost, moulding tool.

BRIEF DESCRIPTION OF THE DRAWINGS

Embodiments of the invention will now be described, by way of example only, with reference to the accompanying Figures, in which:

FIG. 1 is a cross-sectional view, in the width direction of the mould, of an arrangement of a plurality of overlapping surfacing films formed in a first step of an embodiment of the method of the present invention;

FIG. 2 is a cross-sectional view, in the length direction of the mould, of the surfacing films of FIG. 1;

DETAILED DESCRIPTION

Figure 3:
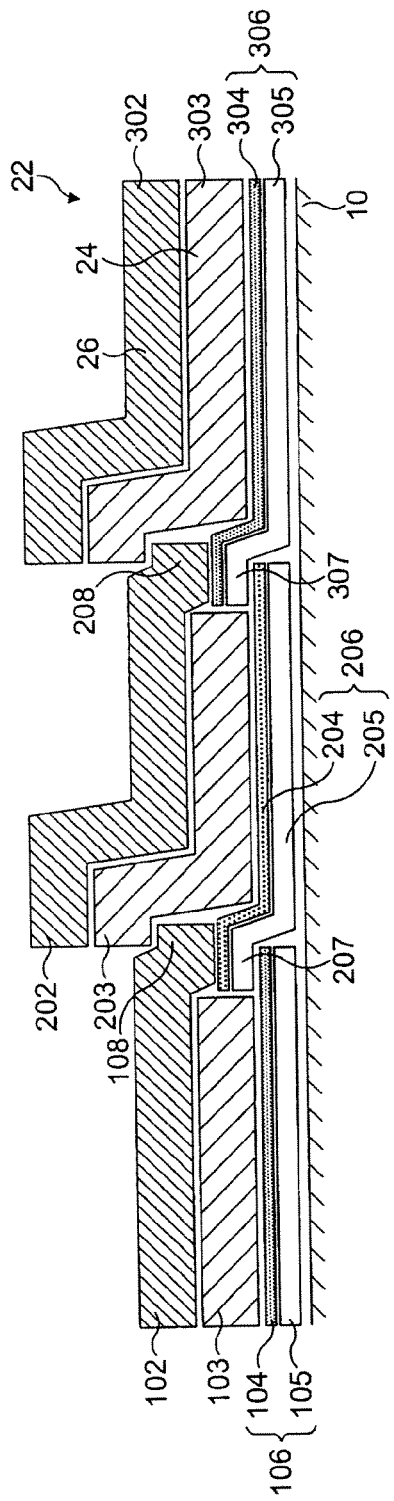
FIG. 3 is a cross-sectional view, in the width direction of the mould, of the surfacing films of FIG. 1 subsequently covered by a first two layers of dry fabric reinforcements in a second step of the embodiment of the method of the present invention.

In accordance with the preferred embodiments of the present invention, the basic manufacturing process for the fibre-reinforced composite moulding includes the steps of:

preparing a mould and applying a release agent;

optionally placing in the mould a surfacing layer comprising a surfacing resin film in the form of at least one solid sheet, with preferable overlaps between adjacent segments of the surfacing layer, the surfacing layer optionally being provided in combination with a dry fabric reinforcement layer adjacent to the surfacing layer which is pre-tacked to the surfacing layer;

placing in the mould, over the surfacing layer, a structural layer comprising structural dry fabric reinforcements, with preferable overlaps between adjacent segments of the structural layer;

placing in the mould, over the structural layer, at least one partially or fully impregnated pre-preg layer comprising fibre reinforcements and resin material, most preferably unidirectional fibre reinforcements extending along the length direction of the mould;

optionally placing over the structural layer additional structural dry fabric reinforcements and/or pre-preg layers to form an interleaved structure of these layers, optionally placing a core material over the structural and pre-preg layers;

placing and connecting a resin feed infusion system;

covering the mould with a peel ply, a release film, an optional infusion mesh and a vacuum bag;

debulking the system under full vacuum;

conditioning the system at the resin infusion temperature to remove remaining entrapped air and to soften the surfacing resin film;

creating a pressure differential across the system and using the pressure differential to feed a resinous compound into the system to coat the fibrous reinforcement capable of being infused;

ceasing the feeding of the resinous compound into the system;

maintaining some pressure differential; and allowing the resinous compound, the pre-preg resin and the surfacing resin film when present to set and cure.

A more detailed explanation of the process steps in accordance with one particular embodiment is described with reference to FIGS. 1 to 6 of the drawings. In this illustrated embodiment, surfacing layers are initially applied into the mould and the surfacing resin is co-cured with the infusion resin. However, the surfacing layers may be omitted, and instead a conventional gel coat may be used to provide the surface of the moulding.

FIGS. 1 and 2 show the preferred layout for the surfacing layers depending on their location in a mould. Referring to FIGS. 1 and 2, after preparing a mould and applying a release agent (not shown) to the mould surface 10, a surfacing layer 12 is applied to the mould surface 10. The surfacing layer 12 comprises a surfacing resin layer 14 in the form of at least one solid sheet that is carried on a layer 16 of scrim material to assist resin retention of the mould surface 10. Typically the scrim layer 16 is a polyester material, such as a polyester veil 16.

In the illustrated embodiment, the surfacing layer 12 comprises a plurality of surfacing layer segments 106, 206, 306 assembled together to form a continuous surfacing layer 12 in the form of plural solid sheets.

When assembling the surfacing layer 12 onto the mould surface 10, a first segment 106 is overlapped by a second segment 206 in the width direction of the mould, the overlap forming a lower covered edge portion 107 of the first segment 106 and an upper covering edge portion 207 of the second segment 206. In turn, the second segment 206 is overlapped by a third segment 306 in the width direction of the mould, the overlap forming a lower covered edge portion 208 of the second segment 206 and an upper covering edge portion 307 of the third segment 306. Accordingly, the opposing edge portions 207, 208, longitudinally directed along the mould, of the second segment 206 have an overlapping, over or under respectively, relationship with an edge portion 107, 307 of the respective adjacent segment 106, 306.

Although not illustrated, if there are further segments in the width direction, this overlapping configuration is repeated across the width of the mould for successive segments.

In the length direction of the mould, it is possible to have different configurations of the surfacing layer. In many embodiments, a continuous length of surfacing layer can be disposed along the length of the mould, and where possible this may be preferable to reduce lay-up time, for example. In other alternative embodiments, the surfacing layers can overlap or abut in the length direction of the mould.

However in this particular embodiment, in the length direction of the mould, there is an abutting relationship. Referring back to the drawings, adjacent to the first segment 106 is a fourth segment 406. The fourth segment 406 abuts and is positioned flush with the edge of the first segment 106. Correspondingly, a fifth segment 506 abuts the fourth segment 406 and is positioned flush with the edge of the fourth segment 406.

Each surfacing layer segment 106, 206, 306, 406, 506 comprises a surfacing resin layer segment 105, 205, 305, 405, 505 that is carried on a scrim material segment 104, 204, 304, 404, 504.

Again, although not illustrated, if there are further segments in the length direction, this abutting configuration is repeated across the length of the mould for successive segments.

Additional segments are disposed in the mould, in an overlapping relationship in one direction, and in an abutting relationship in another direction, so as to cover the entire mould surface. The plural surfacing layer segments 106, 206, 306, 406, etc. therefore form a segmented continuous surfacing layer 12 in the form of a plurality of solid sheets.

In an alternative embodiment, there may be such an overlapping relationship for the surfacing films in two mutually oriented directions, for example in the length direction of the mould as well as the width direction of the mould which is orthogonal thereto. This can provide that all of the surfacing layer edges have an overlapping relationship, except at the extremities of the mould.

Figure 4:
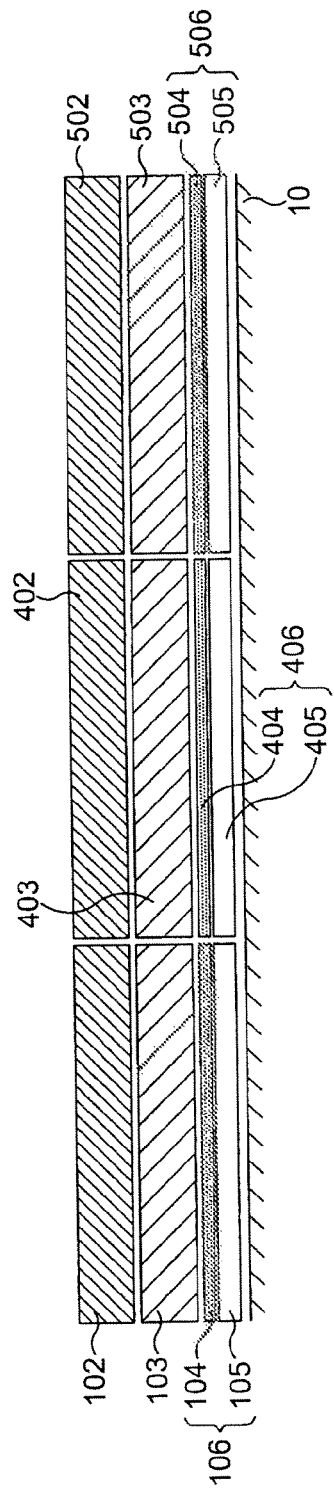
FIG. 4 is a cross-sectional view, in the length direction of the mould, of the assembly of FIG. 3.

Referring to FIGS. 3 and 4, after the surfacing layer 12 has been formed, a structural layer 22 comprising at least one layer 24, 26 of dry fibrous reinforcing material is disposed on the surfacing layer 12 to provide, on the portion of the mould surface 10, an assembly, in the form of a laminar stack, of the surfacing layer 12 and structural layer 22. The dry fibrous reinforcing material may be selected from one or more of glass fibre, aramid fibre, carbon fibre, flax, or jute, or mixtures thereof.

The at least one layer 24, 26 of fibrous reinforcing material may be segmented and subsequently positioned above the surfacing layer 12 in an overlapping segmented configuration, similar to that for the surfacing layer 12, to provide a venting structure and allow entrapped air to pass out during subsequent resin infusion processing.

In the overlapping segmented configuration, a respective segment stack of dry reinforcement layers 102, 103; 202, 203; 302, 303 is located over the respective surfacing layer segment 106; 206; 306.

Initially, a segment stack of dry reinforcement layers 102, 103 is disposed over the first surfacing layer segment 106.

The lowermost dry reinforcement layer 103 of the first stack segment is shaped and dimensioned so as to cover that portion of the upper surface of the first surfacing layer segment 106 which is exposed, and so abuts the edge portion 207 of the second segment 206. The next dry reinforcement layer 102 is placed over the first dry reinforcement layer 103 and is shaped and dimensioned so as to cover the lowermost dry reinforcement layer 103 and, by an edge portion 108 of the next dry reinforcement layer 102, the edge portion 207 of the second segment 206.

Subsequently, a second segment stack of dry reinforcement layers 202, 203 is disposed over the second surfacing layer segment 206.

The lowermost dry reinforcement layer 203 of the second stack segment is shaped and dimensioned so as to cover that portion of the upper surface of the second surfacing layer segment 206 which is exposed, and so abuts the edge portion 307 of the third segment 306, and also so as to cover the edge portion 108 of the dry reinforcement layer 102. The next dry reinforcement layer 202 is placed over the lowermost dry reinforcement layer 203 and is shaped and dimensioned so as to cover the lowermost dry reinforcement layer 203 and, by an edge portion 208 of the next dry reinforcement layer 202, the edge portion 307 of the third segment 306.

Subsequently, a third segment stack of dry reinforcement layers 302, 303 is disposed over the third surfacing layer segment 306.

The lowermost dry reinforcement layer 303 of the third stack segment is shaped and dimensioned so as to cover that portion of the upper surface of the third surfacing layer segment 306 which is exposed, and so as to cover the edge portion 208 of the dry reinforcement layer 202. The next dry reinforcement layer 302 is placed over the lowermost dry reinforcement layer 303 and is shaped and dimensioned so as to cover the lowermost dry reinforcement layer 303.

If there are further segments across the width of the mould, subsequent segment stacks of dry reinforcement layers are correspondingly applied in an overlapping configuration.

In the length direction of the mould, as for the surfacing layer it is possible to have different configurations of the dry reinforcement layers. In many embodiments, a continuous length of dry reinforcement layer can be disposed along the length of the mould over the surfacing layer, and where possible this may be preferable to reduce lay-up time, for example. This continuous dry reinforcement can provide improved mechanical properties in the length direction, particularly for a wind turbine blade, because of the absence of longitudinally spaced joints in the dry reinforcement. In other alternative embodiments, the dry reinforcement layers can overlap or abut in the length direction of the mould.

However in this particular embodiment, in the length direction of the mould, there is an abutting relationship. Referring back to the drawings, the fourth segment 406 is correspondingly covered by dry reinforcement layers 402, 403 that abut and are positioned flush with the edges of the dry reinforcement layers 102, 103. Correspondingly, the fifth segment 506 is covered by dry reinforcement layers 502, 503 that abut and are positioned flush with the edges of the dry reinforcement layers 402, 403 over the fourth segment 406.

Again, although not illustrated, if there are further segments in the length direction, this abutting configuration of the dry reinforcement layers is repeated across the length of the mould for successive segments.

The structural dry reinforcement layers are disposed in the mould over the respective surfacing segments, in an overlapping relationship in one direction, and in an abutting relationship in another direction, so as to cover the entire mould surface. This forms a segmented continuous structural layer 22.

In an alternative embodiment, there may be such an overlapping relationship for the structural dry reinforcement layers in two mutually oriented directions, for example in the length direction of the mould as well as the width direction of the mould which is orthogonal thereto. This can provide that all of the structural dry reinforcement layer edges have an overlapping relationship, except at the extremities of the mould. The selection of the particular overlapping relationship can depend on the structure and composition of the dry fabric reinforcement layers, and the particular nature and end application of the article being manufactured.

The provision of such an overlapping relationship for the structural dry reinforcement layers in two mutually oriented directions may be provided with either of the two overlapping configurations for the surfacing layer disclosed above, i.e. with the surfacing layer overlapping in only one direction or in two mutually oriented directions.

Figure 7:
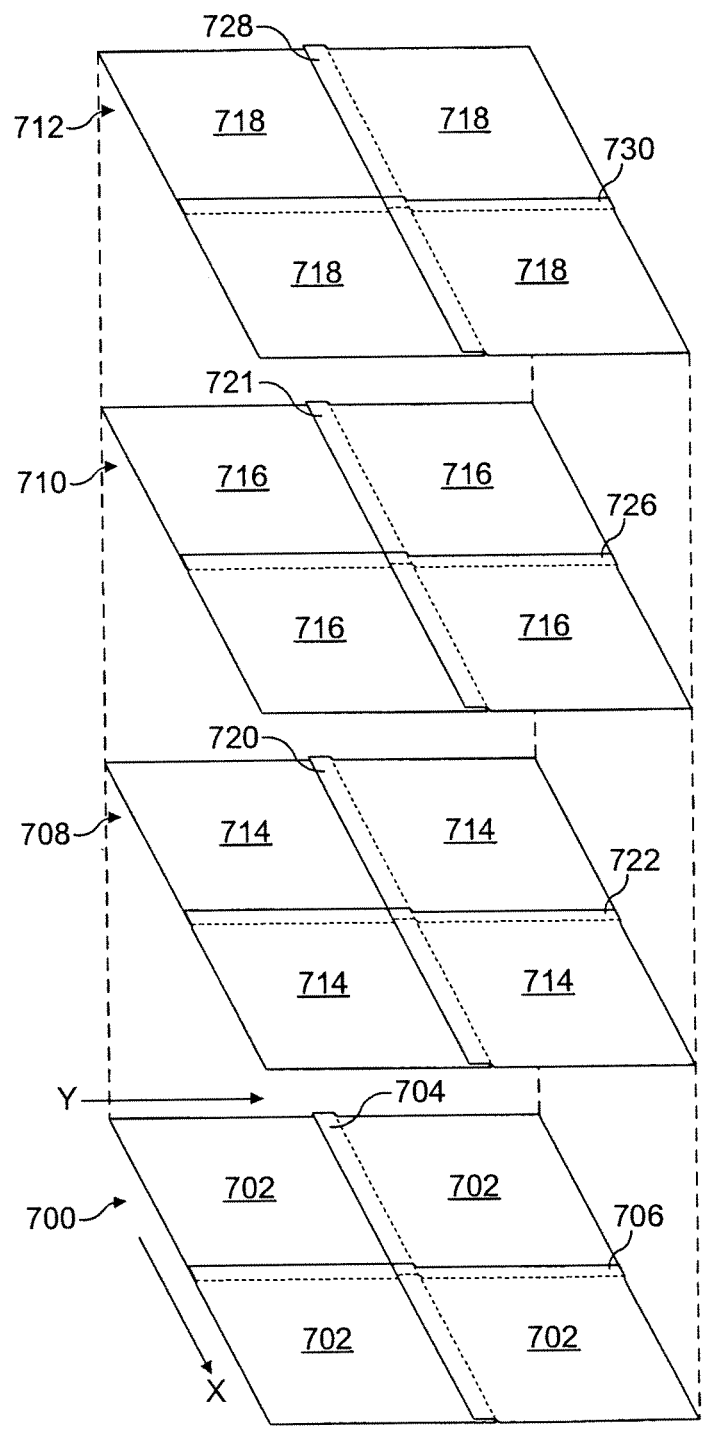
FIG. 7 is an exploded plan view, partly in phantom, of an arrangement of a plurality of overlapping surfacing films and layers of overlapping dry fabric reinforcements formed, the overlapping in each case being in the length direction of the mould and in the width direction of the mould, in accordance with a further embodiment of the method of the present invention.

FIG. 7 is an exploded plan view, partly in phantom, of an arrangement of a plurality of overlapping surfacing films and layers of overlapping dry fabric reinforcements formed, the overlapping in each case being in the length direction of the mould (x) and in the width direction of the mould (y), in accordance with a further embodiment of the method of the present invention. The surfacing film 700 includes a plurality of segments 702 that overlap on adjacent edges 704, 706, oriented in two orthogonal directions (x and y).

Each of three stacked layers 708, 710, 712 of dry fabric reinforcement includes a respective plurality of segments 714, 716, 718 that also overlap on adjacent edges 720, 722; 724, 726; 728, 730, oriented in two orthogonal directions. As discussed herein, in such a stack of overlapped segments the dry fabric reinforcement layers are typically biaxial and/or triaxial dry fabric reinforcement layers.

It will be apparent to the skilled person that the illustrated embodiment incorporates two structural dry reinforcement layers but fewer or more layers, and core materials such as wood and foam, may be employed if desired.

In an alternative embodiment, a first layer of reinforcement fibre may be initially adhered, by tacking, to the surfacing layer segments that are laid down onto the mould surface. Accordingly the first layers disposed in the mould are integral resin surfacing and fibre reinforcement layers. This embodiment can reduce the total lay-up time required to assemble all of the layers to form the laminate in the mould.

Figure 5:
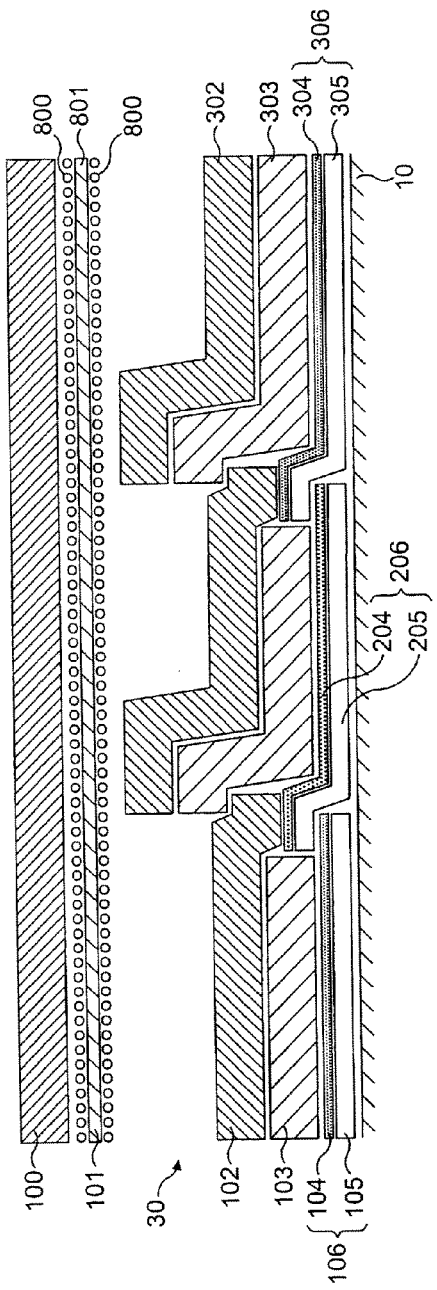
FIG. 5 is a cross-sectional view, in the width direction of the mould, of the assembly of FIG. 3 subsequently covered by a pre-preg layer and additional dry fabric reinforcements in a subsequent step of the embodiment of the method of the present invention.
Figure 6:
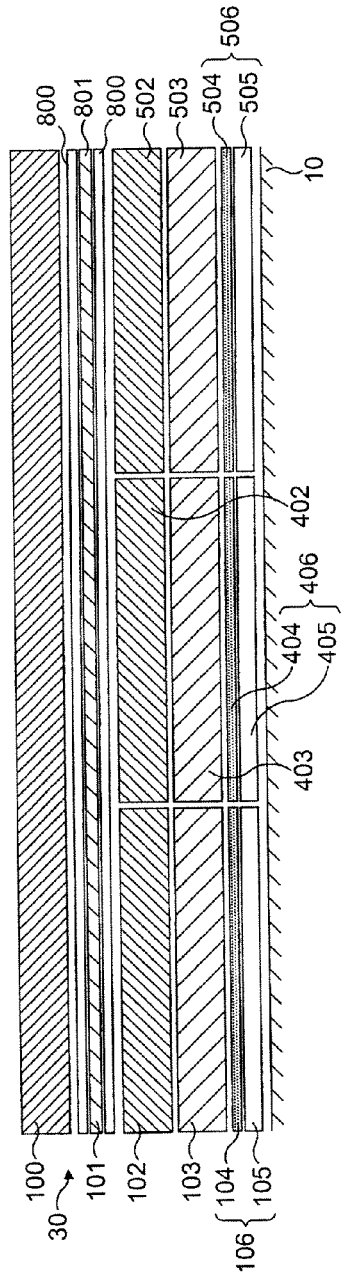
FIG. 6 is a cross-sectional view, in the length direction of the mould, of the assembly of FIG. 5.

Referring to FIGS. 5 and 6, at least one pre-preg layer 101 is then disposed over the structural layer 22. The pre-preg layer 101 is not shown to scale, for the purpose of clarity of illustration. The pre-preg layer 101 comprises fibre reinforcements 800, most preferably unidirectional fibre reinforcements extending along the length direction of the mould, adhered to an uncured pre-preg resin 801. The pre-preg layer 101 preferably comprises a sandwich structure of two opposed laminae of outer fibre reinforcements 800 with a central uncured pre-preg resin layer 801 therebetween. In the pre-preg layer 101 the fibre reinforcements 800 may be partly or fully impregnated by the uncured resin 801. Plural pre-preg layers 101 may be stacked together. One or more additional structural dry reinforcement layers 100 are disposed over the pre-preg layer(s) 101. This forms an interleaved structure between the structural dry fabric reinforcements and/or UD pre-preg layers to form an interleaved structure of these layers.

At least one additional layer, for example a foam core (not shown) and/or one or more additional structural dry reinforcement layers (not shown) may be placed over the interleaved structure. This completes the laminate stack 30 which is now ready for resin infusion, as shown in FIG. 6.

The embodiment illustrated in FIGS. 1 to 6 preferably incorporates a triaxial dry fabric reinforcement structure, in which the fibres of the structural dry reinforcement layers are oriented in three respective axial directions. However in alternative embodiments, the configuration of the dry fabrics structural reinforcement layers may be different. For example, the structural dry fabrics could either be unidirectional (UD), biaxial or triaxial in orientation. The overlaps of the dry fabrics would generally exist in the both the width and length directions for biaxial and triaxial orientations. In general, unidirectional (UD) fabrics overlap in the width direction, whereas in the length direction such overlap is not necessary and would generally only occur if, during lay-up of the fabric into the mould, there is a short fabric roll and the fabric stops in the middle of the mould.

The resin infusion is then carried out in a manner known to those skilled in the art. In particular, the assembly of surface, structural, pre-preg and additional layers on the mould is covered with, in turn, a peel ply, a release film and an optional infusion mesh to increase the impregnation speed in selected parts of the laminate. Then the entire mould assembly is disposed within a vacuum bag. A resin feed infusion system is connected to the bag, the bag having an upstream port connected to a source of resinous compound and a downstream port connected to a source of vacuum. The vacuum is applied to the vacuum bag with the upstream port closed thereby to debulk the system under full vacuum. If necessary, any leaks are identified and repaired if present. The vacuum is maintained at a desired level in order to condition the system at the resin infusion temperature to remove remaining entrapped air and soften the surfacing resin film. Then the upstream port is opened, thereby creating a pressure differential across the system. The pressure differential acts to feed a liquid resinous compound from the source of resinous compound into the system to coat the fibrous reinforcement. In this way, the resinous compound is infused completely into the dry fibrous reinforcement layers. Sufficient structural infusion resin is fed to the system to fully impregnate the fibres. Finally, the feeding of the resinous compound into the system is terminated, and full vacuum is applied to the system.

The infused structural resin then increases in viscosity and begins to cure after a time period governed by the resin reactivity and the amount of heat applied to the laminate. Alternatively the vacuum may be reduced if the resin has a long gel time to prevent the resin being drained out of the laminate. Additional heat can be applied during, or after, resin injection to speed up the curing process of the structural resin and activate the cure of the surface and pre-prep resins.

The pre-preg and infused structural resin materials are cured at least partially simultaneously. The structural portion formed from the pre-preg is bonded to the structural portion formed from dry fibrous reinforcing material by the co-cured pre-prep resin material and infusion resin material. The pre-preg and infused structural resin materials have a respective curing temperature range, and the curing temperature ranges overlap, and the curing step is carried out at a temperature within each curing temperature range. The infused resin material has a curing temperature range that is lower than the curing temperature range of the pre-preg resin material. The curing step may be carried out at a temperature, e.g. at an ambient temperature of for example 20 degrees Centigrade, or at an elevated temperature, for example up to 40 degrees Centigrade, within the curing temperature range of the infused resin material. The curing of the infused resin material is exothermic and generates heat to raise the temperature of the pre-preg resin material to within the curing temperature range of the pre-prep resin material. Optionally, the mould is additionally heated to raise the temperature of the pre-preg resin material to within the curing temperature range of the pre-preg resin material. This can further accelerate the cure of the pre-preg resin.

When a surfacing layer of uncured resin is initially disposed on the mould surface, the surfacing layer uncured is, in the curing step, cured at least partially simultaneously with the pre-preg and infused resin materials. Again, exothermic heat from the curing infused resin can initiate or accelerate the cure of the surface resin, and optionally the mould may be heated to accelerate the curing further.

After complete curing of the structural infusion resin, the pre-preg resin and, when present, the surface resin, the vacuum is removed, the vacuum bag is opened, the peel ply, release film and infusion mesh are removed, and the laminate is released from the mould. When the surface resin is present, the surface of the laminate, substantially ready for painting, comprises the cured surface resin and the scrim layer. Alternatively, a gelcoat may be present as known in the art.

The surfacing resin 14 is selected such that it is air permeable to provide an additional pathway for the removal of air during the evacuation process. The thickness of the surfacing layer 12 is preferably selected to be 100-400 microns, more preferably 100-300 microns. Within this thickness range it has been found that the surfacing resin 14 can be made partially air permeable. If the surfacing resin layer 14 is too thin then a sufficient thickness barrier is not obtained between the fibre reinforcement and the subsequently applied paint causing a pattern of the underlying fibres, known as a print pattern, potentially to appear on the resin surface. If the layer is too thin, this can lead to dry fibre close to the surface that can cause problems when sanding the surface prior to painting. The resulting dry glass fibre particles can get trapped on the abrading tool (e.g. a disc) and are very abrasive, which can lead to scratch marks, in turn requiring repeated abrasive tool changes and additional filling and fairing repair steps prior to painting.

The air between the mould surface 10 and the surfacing layer 12 can pass through the surfacing layer 12 and into the more highly air permeable dry fibre layers 102 and 103, to then be drawn away into the vacuum source. It is not essential that an air breathing scrim 16 is provided in the surface layer 12 so as to be located substantially at the mould surface 10. However, the use of a scrim 16 provides the advantage that the tack of the surface resin 14 is more consistent and depends only on the resin formulation of the surface resin 14 which is formulated to give the desired and consistent tack level. The fine polyester scrim 16 within the surfacing layer 12 serves two purposes. First, it helps prevent fibres of the structural fibre reinforcement from entering the surface resin layer 14. Moreover, the fine weave layer helps prevent the resin 14 in the surfacing layer 12 reticulating off the mould surface 10 giving a better quality of finish to the surface of the resultant laminate. The polyester scrim 16 is itself easy to sand and does not result in abrasive particles damaging the surface.

The dry reinforcement layers provide one or more highly permeable air venting paths to remove air when a vacuum is applied to the laminate stack. As the pieces of material are overlapped the surface layer is now in connection with the highly air permeable dry fibre layer allowing a more direct and effective air path to the vacuum source. The overlapping zone allows more effective connection of the dry reinforcement to give a highly permeable venting structure. The continuous surface resin prevents defects occurring at the point of overlap of the material. The zone is an important feature of the present invention, and is necessary for heavier weight fabrics above 600 gsm. Without the overlapping zone the air permeability across the overlapped fabric is reduced leading to defects in larger components.

As well as providing a thickness buffer to avoid fibre print, the surface resin layer 14 provides a protective barrier for reducing moisture ingress into the laminate. Fibre strands, in particular of glass fibre, close to the surface can accelerate moisture ingress by a wicking mechanism.

The surface resin 14 may be toughened and the modulus reduced by the incorporation of rubber, for example, into the resin. This is a particular advantage as this helps to prevent cracks from any mismatch in thermal expansion between the subsequently-applied paint and the laminate. The tailored surface resin helps improve paint chipping that occurs in impact situations.

The overlapping configuration of the dry reinforcement layers 102, 103, 202, 203, 302, 303 provides one or more highly permeable air venting paths to remove air when a vacuum is applied to the laminate stack. As the pieces of material are overlapped, the edge portion 207 of the surfacing layer 206 is directly in connection with the highly air permeable dry fibre layer 102 allowing a more direct and effective air path to the vacuum source in subsequent processing, as discussed below.

The overlapping zone allows more effective connection between the dry reinforcement layers 102, 103, 202, 203, 302, 303 to give a highly permeable venting structure. The continuous surfacing segment layers 106, 206, 306 including the surfacing resin layer segments 105, 205, 305 prevent defects occurring at the point of overlap of the material.

Due to the venting structure the trapped air is removed by the application of vacuum to the material and the cured surface layer is virtually free of voids. This resultant surface structure has been found to reduce the rate of coating erosion.

The structural infusion resin and surface resin have a different viscosity. The viscosity of the structural infusion resin is usually selected to be lower than that of the surface resin at infusion temperature, so that the structural infusion resin can readily be infused without the vacuum disrupting the surface resin layer. The viscosity of the surface resin is higher than the structural infusion resin to ensure that the surface resin stays closer to the mould surface to maintain the thickness of the surface layer in the final component.

Materials with different viscosity profiles can be made to work by adjusting the cure cycle provided a differential viscosity exists between the surfacing resin layer and structural infusion resin.

The surfacing film is required to have a relatively high minimum viscosity to prevent premature wet-out of the dry fibre reinforcement prior to termination of the resin infusion step. The viscosity must also be sufficiently high to stop the dry fibre reinforcement moving to the surface. The viscosity must also be sufficiently high to ensure that the surfacing layer remains as a coherent resin layer during the composite moulding material production process. However, the viscosity must not be too high otherwise the wettability of the mould surface by the surfacing resin may be inadequate. The surfacing resin should also have a sufficient degree of flow to enable the solid resin layer to fill any minor discontinuities or voids at any overlaps between the separate surfacing sheet segments when the surfacing layers are subjected to vacuum processing prior to curing. The surfacing resin should also have a good cold-flow resistance to enable the solid resin layer in sheet form to be stored on a roll, and have a good shelf-life and product stability. The surfacing resin should also have a good abrasion resistance (typically measured in a Taber abrasion test) to permit some degree of surface abrasion, for example sanding of the primer surface resin layer prior to painting, whilst maintaining surface toughness and integrity.

Typically, the surfacing resin has a viscosity of from $0.1 \times 10^5$ to $5 \times 10^5$ Pa·s measured at 20° C.

The structural infusion resin in contrast has a lower viscosity to enable it readily to be infused under vacuum into the dry fibrous reinforcement layers.

Typically, the structural infusion resin has a viscosity of from 0.1 to 2 Pa·s measured at 20° C., preferably from 0.1 to 0.6 Pa·s.

In this specification, the resin viscosity of the structural infusion resin is measured using a TA Instruments AR2000 rheometer with a 40 mm diameter aluminium 2° cone and a Peltier cooling system. The experiment was carried out under the following conditions: a course shear rate sweep experiment at 20° C. from $0.01$ $s^{-1}$ to 500 $s^{-1}$ with a gap of 57 μm. The viscosity of the material was taken as an average during the linear Newtonian region between 1-100 $s^{-1}$.

In this specification the resin viscosity of the surfacing resin is measured using a TA Instruments AR2000 rheometer with a 20 mm diameter steel plate and a Peltier cooling system. The experiment was carried out under the following conditions: oscillation experiment from 40° C. down to 0° C. at 2° C./min with a controlled displacement of $1 \times 10^{-4}$ rads at a frequency of 1 Hz and a gap of 1000 μm.

Moreover, the structural infusion resin has a viscosity to enable it readily to be infused under vacuum conditions that in contrast do not cause any significant spreading or flow of the surfacing resin. The surfacing resin should have a viscosity that is higher than the structural infusion resin so that the surfacing resin cannot wet the structural reinforcement before the surfacing resin (i.e. the surfacing resin must be thick enough to achieve this technical effect), but the viscosity should be low enough so that the surfacing resin can exhibit a minor degree of spreading and flow on the mould surface and thereby can assist with air removal under the vacuum processing (i.e. the surfacing resin must be thin enough to achieve this technical effect).

Preferably, the ratio of the viscosity, measured at 20° C. ambient temperature, of the surfacing resin and of the structural infusion resin is at least 100/1, more preferably at least 1000/1, yet more preferably at least 10,000/1.

The structural infusion resin has a slow reactivity at the infusion temperature to allow full impregnation of the dry fibrous reinforcement layers. The pre-preg resin, and when present the surface resin, begin to cure after the infusion resin initiates curing. This is achieved by exothermic heat generation from the curing infusion resin heating the pre-preg and surface resins to activate the curing mechanism and/or by heating the tool on which the surface resin is disposed. The pre-preg, surface and structural infusion resins continue to cure together at least partially simultaneously which promotes a high level of adhesion between the different resin materials.

The surface resin is preferably selected from the group consisting of thermoset resins such as epoxy, cyanate ester and phenolic resins. Suitable epoxy resins include diglycidyl ethers of bisphenol A, diglycidyl ethers of bisphenol F, epoxy novolac resins and N-glycidyl ethers, glycidyl esters, aliphatic and cycloaliphatic glycidyl ethers, glycidyl ethers of aminophenols, glycidyl ethers of any substituted phenols and blends thereof. Also included are modified blends of the aforementioned thermosetting polymers. These polymers are typically modified by rubber or thermoplastic addition. Any suitable catalyst may be used. The catalyst will be selected to correspond to the resin used. One suitable catalyst for use with an epoxy resin is a dicyandiamide curing agent. The catalyst may be accelerated. Where a dicyandiamide catalyst is used, a substituted urea may be used as an accelerator. Suitable accelerators include Diuron, Monuron, Fenuron, Chlortoluron, bis-urea of toluenedlisocyanate and other substituted homologues. The epoxy curing agent may be selected from Dapsone (DDS), Diamino-diphenyl methane (DDM), BF3-amine complex, substituted imidazoles, accelerated anhydrides, metaphenylene diamine, diaminodiphenylether, aromatic polyetheramines, aliphatic amine adducts, aliphatic amine salts, aromatic amine adducts and aromatic amine salts.

The surface material can be provided with a toughening agent. Suitable toughening agents can be selected from liquid rubber (such as acrylate rubbers, or carboxyl-terminated acrylonitrile rubber), solid rubber (such as solid nitrite rubber, or core-shell rubbers), thermoplastics (such as poly (EtherSulphone), poly (Imide)), block copolymers (such as styrene-butadiene-methacrylate triblocks), or blends thereof.

The structural infusion resin is preferably selected from the group consisting of thermoset resins such as epoxy, cyanate ester and phenolic systems. Suitable epoxy resins include diglycidyl ethers of bisphenol A, diglycidyl ether of bisphenol F, glycidyl ethers of any substituted phenols, higher molecular weight of any of those molecules, epoxy novolac resins and glycidyl esters, aliphatic and cycloaliphatic glycidyl ethers, glycidyl of aminophenols, glycidyl amine and blends thereof.

Reactive or non reactive diluents can also be used. Reactive diluents may include monofunctional or multifunctional reactive diluents such as C12-C14 glycidyl ether or butane diol diglycidyl ether. Non reactive diluents may include nonyl phenol, furfuryl alcohol, dibutyl phthalatem, polymethyl acetal.

Also included are modified blends of the aforementioned thermosetting polymers, with such modifiers as liquid rubber (such as acrylate rubbers, or carboxyl-terminated acrylonitrile rubber), solid rubber (such as solid nitrite rubber, or core-shell rubbers), thermoplastics (such as poly (EtherSulphone), poly (Imide)), block copolymers (such as styrene-butadiene-methacrylate triblocks), or blends thereof.

The curing agent or catalyst will be selected to correspond to the resin used. Suitable curing agents are aliphatic amines, cycloaliphatic amines, aromatic amines, polyamides, amidoamines, polysulfides, anhydride and any suitable adduct of. Suitable catalyst may include salicylic acid, aliphatic tertiary amines, and aminoethylpiperazine.

One suitable latent catalyst for use with an epoxy resin is a dicyandiamide curing agent. The catalyst may be accelerated. Where a dicyandiamide catalyst is used, a substituted urea may be used as an accelerator. Suitable accelerators include Diuron, Monuron, Fenuron, Chlortoluron, bis-urea of toluenedlisocyanate and other substituted homologues. The epoxy curing agent may be selected from Dapsone (DDS), Diamino-diphenyl methane (DDM), BF3-amine complex, substituted imidazoles, accelerated anhydrides, metaphenylene diamine, diaminodiphenylether, aromatic polyetheramines, aliphatic amine adducts, aliphatic amine salts, aromatic amine adducts and aromatic amine salts. Amine and anhydride curing agents are being preferred to give low viscosity and room temperature cure.

Typically the pre-preg resin, infusion resin and surface resin materials have a different viscosity. The viscosity of the pre-preg resin is usually selected to be higher than that of the surface resin at room temperature (20° C.). The surface resin typically has a higher viscosity than the pre-preg resin when heated to keep the surface resin close to the mould surface during processing.

The ratio of the viscosity, measured at 20° C. ambient temperature, of the pre-preg resin material and of the surface resin material is typically from 2 to 14/1, more preferably from 4 to 12/1. The surface resin material preferably has a higher viscosity than that of the pre-preg resin material if the assembly is heated prior to or during curing. The ratio of the viscosity, during such heating, of the surface resin material and of the pre-prep resin material may be from 5 to 25/1, more preferably from 10 to 15/1.

The pre-preg resin is preferably selected from the group consisting of thermoset resins such as epoxy, cyanate ester and phenolic systems. Suitable epoxy resins include diglycidyl ethers of bisphenol A, diglycidyl ethers of bisphenol F, epoxy novolac resins and N-glycidyl ethers, glycidyl esters, aliphatic and cycloaliphatic glycidyl ethers, glycidyl ethers of aminophenols, glycidyl ethers of any substituted phenols and blends thereof. Also included are modified blends of the aforementioned thermosetting polymers. These polymers are typically modified by rubber or thermoplastic addition. Any suitable catalyst may be used. The catalyst will be selected to correspond to the resin used. One suitable catalyst for use with an epoxy resin is a dicyandiamide curing agent. The catalyst may be accelerated. Where a dicyandiamide catalyst is used, a substituted urea may be used as an accelerator. Suitable accelerators include Diuron, Monuron, Fenuron, Chlortoluron, his-urea of toluenedlisocyanate and other substituted homologues. The epoxy curing agent may be selected from Dapsone (DDS), Diamino-diphenyl methane (DDM), BF3-amine complex, substituted imidazoles, accelerated anhydrides, metaphenylene diamine, diaminodiphenylether, aromatic polyetheramines, aliphatic amine adducts, aliphatic amine salts, aromatic amine adducts and aromatic amine salts.

The fibres of the pre-preg layer may be comprised of fibrous material such as glass fibre, aramid, carbon fibre, or natural fibres such as jute or hemp.

The pre-preg resin material may be a thermosetting epoxy resins. The pre-preg resin material typically has a viscosity of from $0.75 \times 10^5$ to $5 \times 10^6$ Pa·s measured at 20° C.

This pre-preg resin typically has a sufficiently high viscosity at room temperature to prevent it from significantly impregnating the structural dry fibrous reinforcing material 102, 103 during the period, typically from 1 to 3 hours, of the resin infusion process during which the pre-preg resin is under vacuum. Preferably a pre-preg system such as WE90-1 or WE92 available from Gurit which have a viscosity of around $1 \times 10^5$ Pa. at 20° C. would be used.

The pre-preg resin is preferably formulated to be a thermosetting epoxy resin with a latent curing agent, which is activated by heat. Other thermosetting resins may be used; such as those derived from cyanate ester and phenolic systems. Suitable epoxy resins include diglycidyl ethers of bisphenol A, diglycidyl ethers of bisphenol F, epoxy novolac resins and N-glycidyl ethers, glycidyl esters, aliphatic and cycloaliphatic glycidyl ethers, glycidyl ethers of aminophenols, glycidyl ethers of any substituted phenols and blends thereof. Also included are modified blends of the aforementioned thermosetting polymers. These polymers are typically modified by rubber or thermoplastic addition. Any suitable catalyst may be used. The catalyst will be selected to correspond to the resin used. One suitable catalyst for use with an epoxy resin is a dicyandiamide curing agent. The catalyst may be accelerated. Where a dicyandiamide catalyst is used, a substituted urea may be used as an accelerator. Suitable accelerators include Diuron, Monuron, Fenuron, Chlortoluron, bis-urea of toluenedlisocyanate and other substituted homologues. The epoxy curing agent may be selected from Dapsone (DDS), Diamino-diphenyl methane (DDM), BF3-amine complex, substituted imidazoles, accelerated anhydrides, metaphenylene diamine, diaminodiphenylether, aromatic polyetheratnines, aliphatic amine adducts, aliphatic amine salts, aromatic amine adducts and aromatic amine salts.

The preferred embodiments of the present invention provide the use, for forming a composite laminate having a high quality smooth defect-free surface that can be painted, of the combination of (a) a low temperature activated, typically from 50° C. and above, more typically from 50° C. to 90° C., relatively high viscosity thermoset curing resin for forming a surface of the composite laminate with (b) a relatively low viscosity thermoset curing resin suitable for resin infusion processing for forming, after infusion into fibre-reinforcement located adjacent to the surfacing resin, a fibre-reinforced structure of the composite laminate.

The surface resin film is easy to sand, if necessary, to prepare the laminate surface for subsequent painting.

In accordance with the preferred embodiments of the present invention, the surface resin is formulated to provide the desired correct characteristics. In particular, the surface resin has a viscosity so that it can be applied into a mould at about ambient temperature and exhibit the desired levels of tack to the mould and drape. Heat may be supplied to the resin to initiate or accelerate curing either during or after completion of the resin infusion stage.

In higher production rate vacuum infusion production, the tooling is heated during or after resin injection to speed up the cure rate. This offers the opportunity to mix and co-cure these different materials. This is typically a temperature of from 50-90° C. to enable the use of lower cost tooling. The target format is a low temperature (50° C.) activated catalytic cure.

The surfacing layer preferably contains surfacing resin and a polyester veil. During manufacture of the material, the polyester veil is first applied to the top of the surface resin. Some pressure is then applied to push the polyester veil into the top of the surface resin. Preferably, the polyester veil is located at a position within the upper portion of the surfacing resin layer, i.e. the polyester veil is covered on both sides by a respective portion of the surfacing resin layer, with a larger portion, i.e. a majority, on one side that is to be located directly adjacent to the mould surface. If a first fibre layer is also integrated into the surfacing layer, and in particular into the surface of the surfacing layer that is to be located remote from the mould surface, also the fibre layer is pressed into the surface resin to ensure that the surface material is maintained integral with, and stays fixed to, the fibre layer.

In the present invention it is preferred that the thickness of the surface film resin is between 100 and 400 microns, more preferably from 100 to 300 microns. Within this thickness range it has been found the resin can be made partially air permeable. Any air between the mould surface and the surface layer can pass through the surface layer and into the more highly air permeable dry fibre layers, to then be drawn away into the vacuum source.

The surfacing layer is structured and formulated so that the opposed surfaces exhibit differential tack. There is relatively high tack on one surface, the surface that is intended in use to contact and adhere to the mould surface, and relatively low tack on the opposite surface, the surface that is intended in use be manually handled and so is easier to handle. This tack differential can be achieved by providing the scrim material within the solid resin sheet, but offset relatively towards the lower tack surface. This means the tack of the material is more consistent and dependent only on the resin formulation of the surface resin which allows it to be formulated to give the desired and consistent tack level. Furthermore, the high tack level can ensure that a high degree of wetting of the mould surface can be achieved, which renders the surfacing layer to be uniformly adhered to the mould surface over the entire surface area of the surfacing film. This in turn prevents reticulation of the surfacing layer from the mould surface following resin curing. In addition, the surfacing material is tolerant to handling pressure, or the pressure generated when the product is wound onto a roll. As a result the surfacing material used in the method of the present invention has extended room temperature storage prior to use.

The fine polyester scrim within the surfacing resin layer serves two purposes. It helps prevent fibres from the reinforcement entering the surface resin layer. The fine weave layer also helps prevent the resin in the surface resin film layer reticulating off the tool surface giving a better quality of finish. The polyester scrim itself is easy to sand and does not result in abrasive particles damaging the surface. As well as providing a thickness buffer to avoid fibre print the surface resin layer provides a protective barrier for reducing moisture ingress into the laminate. Glass fibre strands close to the surface can accelerate moisture ingress by a wicking mechanism. The surface resin can be toughened and the modulus reduced which is a particular advantage as this helps to prevent cracks from the mismatch in thermal expansion between the paint and the laminate. The tailored surface resin helps improve paint chipping that occurs in impact situations.

For composite structures requiring a painted finish, the preferred embodiments of the present invention can reduce the time taken and cost to prepare a Vacuum Assisted Resin Transfer Moulding (VARTM) fibre reinforced composite component for painting, and moreover the final durability of the painted component can be improved. When using VARTM methods to produce a fibre reinforced composite component, the preferred embodiments of the present invention, in order to produce a finish on composite part that would be easy to prepare for painting, can employ a temperature activated thermoset surface layer which can eliminate the need to apply, and wait for, an in mould gelcoat to tack off during the manufacturing process, The preferred embodiments of the present invention can provide a toughened flexible interface between the paint and the composite part to improve the durability of the final paint finish.

The manufacturing process of the preferred embodiments of the present invention combines hot-melt and infusion technologies to create a defect-free surface laminate ready for painting operations with superior mechanical properties due to the selected use of pre-preg materials. A surface resin layer with a structural fibre reinforcement layer (hot-melt) is placed against the mould and a composite layout compatible with infusion technology is placed over it to provide a venting structure and allow entrapped air to pass out during processing. The rheological behaviours of the hot-melt and infusion resins are different.

The preferred embodiments of the present invention can also provide a sufficient tack level to retain the first dry reinforcement layer on the released tool surface. It is particularly suitable for large parts such as wind turbines, bridges, and boat hulls.

This method of the preferred embodiments of the present invention is particularly suitable for the production of wind-turbine aerofoil sections and any other large components with simpler curvature such as marine craft, ray-domes, architectural mouldings and bridges using infusion technology.

The preferred embodiments of the present invention can provide the manufacture of a composite structure with a defect-free surface, which is ready for painting. By avoiding the need for a gelcoat, correspondingly there is no need for any gelcoat handling, which improves the health and safety aspects of the manufacturing process. In known processes that employ a gelcoat layer, the gelcoat layer provides the advantage that it provides tack to hold in a correct position on the mould surface the first layer of fibre reinforcement The preferred embodiments of the present invention provide the tack in the absence of such a gelcoat layer, because the surfacing layer provides the required tack for the first layer of reinforcement so that it can be can be correctly positioned into the mould.

The preferred embodiments of the present invention can reduce the total production time and the amount of manual labour required for the manufacturing cycle.

Also, in this manufacturing method of the preferred embodiments of the present invention a good surface finish is obtained without the need for additional tissues and high cost fine weave fabrics as compared to some known processes. This can enable lower cost heavier weight reinforcement to be used as the first ply into the mould. The resulting surface free of defects is the primary result which can yield a reduction in the overall time and labour required for the production of a painted composite surface.

The surface resin layer can also provide a protective barrier for reducing moisture ingress into the composite laminate structure. The surface resin can also act as a buffer, and its increased toughness helps to reduce inadvertent paint chipping that can occur in impact situations when the composite product is in operation.

In known resin infusion processes, unidirectional (UD) fibre reinforcement materials that are subject to the resin infusion may be stitched or bonded into a fabric format to give a handleable fibre to put into the mould. However, this expedient adds manufacturing cost and lowers the properties of the resultant composite laminate. In embodiments of the present invention however, the use of a unidirectional (UD) pre-preg is cost effective, because the resin in the pre-preg maintains fibre alignment and can be made tougher and more fatigue resistant, and so the method can use the lowest cost fibre pre-cursors yet give high level properties in the resultant composite laminate. For example, in order to manufacture a turbine blade shell, in accordance with one embodiment of the present invention, pre-consolidated pre-preg UD stacks are interleaved with dry off-axis fabric reinforcements. The dry reinforcements are then infused with liquid resin. The combination of heating the mould and the exothermic reaction of the liquid resin is sufficient to raise the heat of the laminate to activate the cure of the resin in the pre-preg UD material. This UD material then is thick and reactive enough to generate further heat through an exothermic cure to rapidly cure without the need for high heat input. This provides the technical advantage that lower cost, lower temperature resistant moulds and tools can be utilised to cure the composite laminate parts.

The present invention is further illustrated with reference to the following non-limiting Example.

Example 1

A laminate representing the tip section of a wind turbine blade was first assembled onto a mould.

The laminate consisted of:
2 plies XE600 dry+/−45 stitched biax fabric
2 plies of Gurit WE90-1\EGL1200\32% pre-preg
1 ply XE600 dry+/−45 stitched biax fabric
2 plies of Gurit WE90-1\EGL1200\32% pre-preg
2 plies XE600 dry+/−45 stitched biax fabric The unidirectional pre-preg material was set to be narrower at 400 mm wide than the biaxial fabric to simulate the typical construction of a structural shell. A peel ply and an infusion mesh were then applied to the stack and resin feed pipes and vacuum lines set-up so to flow the infusion resin in a transverse direction to the unidirectional fibre to ensure flow into the interleaved biax material.

Gurit Prime 20LV+Slow hardener infusion resin was infused into the laminate at 20° C. On completing the impregnation of the dry fibre the temperature of the tool was increased to 90° C. and held for 6 hours. The infusion resin successfully impregnated all the dry fibre of the biax fabric layers and both the infusion resin and the pre-preg resin co-cured together. An excellent adhesion was found between the materials.

The present invention is not limited to the foregoing illustrated embodiments. It will be apparent to those skilled in the art that various modifications to the present invention may be made without departing from the scope of the present invention as defined in the appended claims.

The invention claimed is:

1. A method of manufacturing a fibre-reinforced composite moulding, the method comprising the steps of:
    disposing at least one layer of fibrous reinforcing material within a mould;
    disposing at least one pre-preg layer adjacent to the fibrous reinforcing material, the pre-preg layer comprising fibrous reinforcement at least partially impregnated with uncured first resin material, to form a laminar assembly of the at least one layer of fibrous reinforcing material and the at least one pre-preg layer within the mould;
    applying a vacuum to the assembly;
    infusing a flowable uncured second resin material, under the vacuum by vacuum assisted resin transfer moulding, into the at least one layer of fibrous reinforcing material; and
    curing the first and second resin materials at least partially simultaneously to form the fibre-reinforced composite moulding which comprises at least one first structural portion formed from the fibrous reinforcement and the cured first resin material bonded to at least one second structural portion formed from the at least one layer of fibrous reinforcing material and the cured second resin material, wherein the second infused resin material has a curing temperature range that is lower than the curing temperature range of the first pre-preg resin material, the curing step is carried out at a temperature within the curing temperature range of the second infused resin material, and the curing of the second resin material is exothermic and generates heat to raise the temperature of the first resin material to within the curing temperature range of the first resin material.

2. A method according to claim 1 wherein in the pre-preg layer the fibrous reinforcement is fully impregnated with uncured first resin material.

3. A method according to claim 2 wherein the pre-preg layer comprises a pre-consolidated slab of a plurality of layers of fibrous reinforcement fully impregnated with uncured first resin material.

4. A method according to claim 1 wherein the at least one pre-preg layer is partially impregnated and comprises a sandwich structure of a pair of fibrous reinforcement layers on opposed sides of a layer of the uncured first resin material.

5. A method according to claim 1 wherein the laminar assembly comprises a plurality of the layers of fibrous reinforcing material interleaved with a plurality of the pre-preg layers.

6. A method according to claim 1 wherein the mould has a length and a width and the layers of fibrous reinforcing material and pre-preg extend substantially continuously along the length of the mould.

7. A method according to claim 1 further comprising the step, before step (a), of disposing a surfacing layer on the mould surface, the surfacing layer comprising a third uncured resin material and being in the form of at least one solid sheet, and in steps (a) and (b) the laminar assembly of the at least one layer of fibrous reinforcing material and the at least one pre-preg layer is disposed over the surfacing layer within the mould, and in the curing step (e) the third resin material is cured at least partially simultaneously with the first and second resin materials.

8. A method according to claim 7 wherein the surfacing layer comprises a plurality of surfacing layer segments assembled together to form a continuous surfacing layer.

9. A method according to claim 8 wherein each surfacing layer segment has at least one edge thereof that partially overlaps an adjacent surfacing layer segment.

10. A method according to claim 7 wherein the third resin material of the surfacing layer has a thickness of from 100 to 300 microns.

11. A method according to claim 7 wherein the third resin material of the surfacing layer has an applied weight thickness of from 100 to 400 grams pre square meter (gsm).

12. A method according to claim 7 wherein the third resin material of the surfacing layer is supported on a carrier of a sheet material.

13. A method according to claim 12 wherein the sheet material of the surfacing layer has a weight of from 10 to 90 gsm.

14. A method according to claim 12 wherein the sheet material of the surfacing layer comprises a polyester spun bonded scrim material.

15. A method according to claim 12 wherein the sheet material of the surfacing layer is located at or proximal to a first face of the surfacing layer.

16. A method according to claim 15 wherein first face of the surfacing layer is remote from the mould surface so that a majority of the third resin material is between the sheet material and the mould surface.

17. A method according to claim 7, wherein the second resin material and the third resin material have different viscosities.

18. A method according to claim 17, wherein the third resin material has a higher viscosity than that of the second resin material at room temperature (20 degrees Centigrade).

19. A method according to claim 18, wherein the ratio of the viscosity, measured at 20° C. ambient temperature, of the third resin material and of the second resin material is at least 100/1.

20. A method according to claim 19, wherein the ratio of the viscosity, measured at 20° C. ambient temperature, of the third resin material and of the second resin material is at least 1000/1.

21. A method according to claim 20, wherein the ratio of the viscosity, measured at 20° C. ambient temperature, of the third resin material and of the second resin material is at least 10,000/1.

22. A method according to claim 17, wherein in the curing step (e) the second resin material is adapted to initiate curing before the third resin material.

23. A method according to claim 1, wherein the curing step (e) is carried out at a temperature of from 40 to 90 degrees Centigrade.

24. A method according to claim 17, wherein in the curing step (e) the curing reaction of the second resin material is exothermic which generates heat which accelerates the curing of the third resin material.

* * * * *

UNITED STATES PATENT AND TRADEMARK OFFICE
CERTIFICATE OF CORRECTION

PATENT NO.       : 8,545,744 B2  
APPLICATION NO. : 12/532907  
DATED            : October 1, 2013  
INVENTOR(S)      : Daniel Thomas Jones Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1038 days.

Signed and Sealed this

Fifteenth Day of September, 2015

Michelle K. Lee  
*Director of the United States Patent and Trademark Office*